United States Patent [19]
Weeks

[11] Patent Number: 4,869,455
[45] Date of Patent: Sep. 26, 1989

[54] MOTOR AND GEAR MOUNTING BRACKET

[75] Inventor: David E. Weeks, Candor, N.Y.

[73] Assignee: NCR Corporation, Dayton, Ohio

[21] Appl. No.: 256,359

[22] Filed: Oct. 11, 1988

[51] Int. Cl.⁴ .................. F16M 3/00; B41J 29/38
[52] U.S. Cl. .................. 248/674; 248/221.4; 400/236.2; 400/691; 400/225; 74/421 R; 74/DIG. 10
[58] Field of Search .............. 248/674, 221.4; 310/91; 400/236.2, 225, 691; 74/421 R; 403/71; 24/297, 453, 662

[56] References Cited

U.S. PATENT DOCUMENTS

| | | | |
|---|---|---|---|
| 3,851,357 | 12/1974 | Ribich et al. | 248/221.4 X |
| 3,870,908 | 3/1975 | Button et al. | 310/91 |
| 3,941,339 | 3/1976 | McCarty | 248/603 |
| 4,034,620 | 7/1977 | McNamara et al. | 74/410 |
| 4,111,290 | 9/1978 | Carlstedt | 192/98 |
| 4,155,020 | 5/1979 | Skare | 310/91 |
| 4,155,528 | 5/1979 | Dawson | 248/674 |
| 4,293,151 | 10/1981 | Manzel | 285/161 |
| 4,410,016 | 10/1983 | Alperin et al. | 248/674 |
| 4,420,136 | 12/1983 | Lau | 248/674 |
| 4,502,583 | 3/1985 | Limbacher | 192/98 |
| 4,531,700 | 7/1985 | Robinson | 248/672 |
| 4,544,168 | 10/1985 | Hans et al. | 277/84 |
| 4,579,473 | 4/1986 | Brugger | 403/71 X |
| 4,616,944 | 10/1986 | Galatha et al. | 400/691 X |
| 4,657,478 | 4/1987 | LaZebnik et al. | 248/674 X |
| 4,676,473 | 6/1987 | Giles | 248/674 X |
| 4,708,228 | 11/1987 | Monstevens | 192/98 X |
| 4,739,543 | 4/1988 | Harris, Jr. | 24/297 |
| 4,780,007 | 10/1988 | Weeks et al. | 400/56 |
| 4,782,564 | 11/1988 | Sloan | 24/453 X |

FOREIGN PATENT DOCUMENTS 133088 7/1984 Japan ............................ 400/236.2

Primary Examiner—Ramon S. Britts
Assistant Examiner—David G. Kolman
Attorney, Agent, or Firm—Wilbert Hawk, Jr.; Albert L. Sessler, Jr.; George J. Muckenthaler

[57] ABSTRACT

A snap-fit fastening or mounting arrangement for a motor having a mounting flange. The fastening or mounting arrangement includes a side frame member having a pair of spring-like snap elements that are integral with the side frame member for securing the motor. The frame member also includes a pair of pilot studs integral therewith and positioned to be received by apertures in the mounting flange to resist torque of the motor. The side frame member includes a plurality of hubs as an integral portion thereof and gears are journaled on the hubs in an arrangement driven by the motor. A fastening element is provided with spring fingers which are inserted into the aperture of each hub and retained thereby to secure the respective gear on the hub.

14 Claims, 4 Drawing Sheets

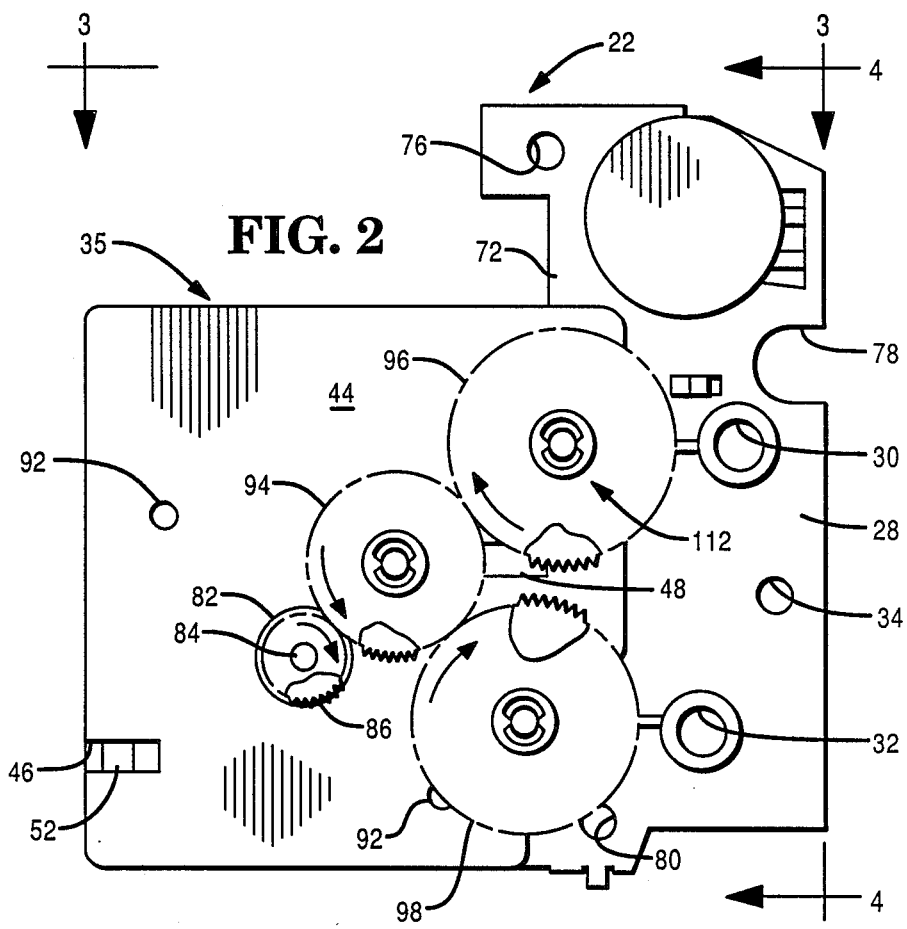
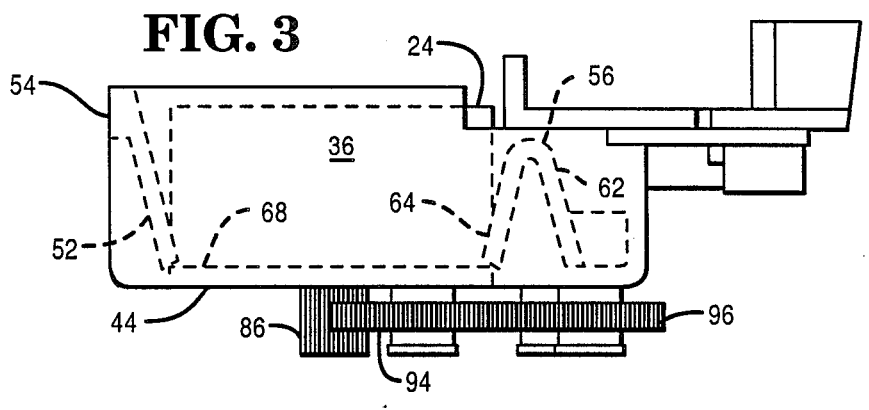

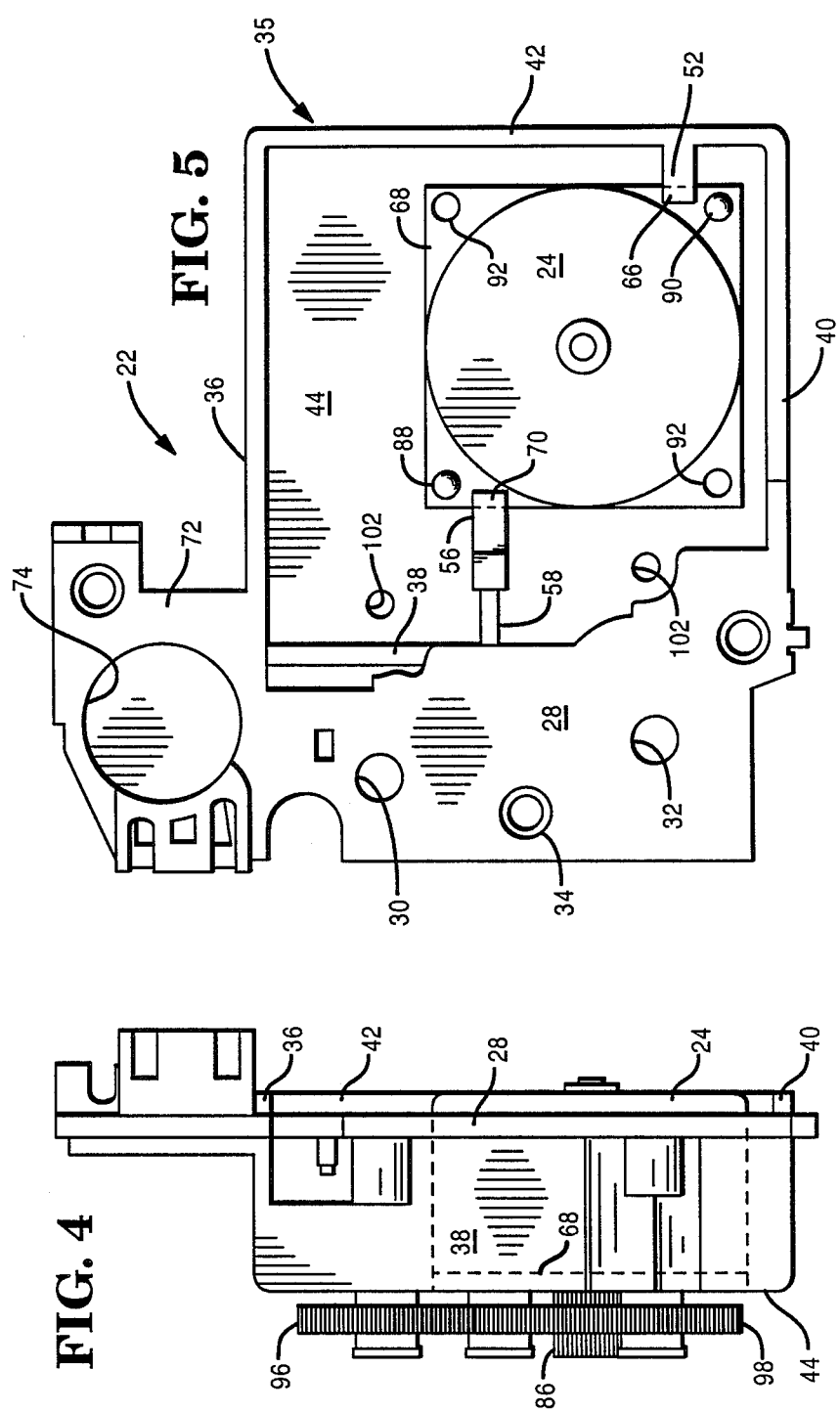

MOTOR AND GEAR MOUNTING BRACKET

BACKGROUND OF THE INVENTION

In the field of printing, the most common type printer has been the printer which impacts against record media that is caused to be moved past a printing line or line of printing. As is well-known, the impact printing operation depends upon the movement of impact members, such as print hammers or wires or the like, which are typically moved by means of an electromechanical drive system and which system enables precise control of the impact members.

In the field of dot matrix printers, it has been quite common to provide a print head which has included therein a plurality of print wire actuators or solenoids arranged or grouped in a manner to drive the respective print wires a very short, precise distance from a rest or non-printing position to an impact or printing position. The print wires are generally either secured to or engaged by the solenoid plunger or armature which is caused to be moved such precise distance when the solenoid coil is energized and wherein the plunger or armature normally operates against the action of a return spring.

It has also been quite common to provide an arrangement or grouping of such solenoids in a circular configuration to take advantage of reduced space available in the manner of locating the print wires in that specific area between the solenoids and the front tip of the print head adjacent the record media. In this respect, the actuating ends of the print wires are positioned in accordance with the circular arrangement and the operating or working ends of the print wires are closely spaced in vertically-aligned manner adjacent the record media. The availability of narrow or compact actuators permits a narrower or smaller print head to be used and thereby reduces the width of the printer because of the reduced clearance at the ends of the print line. The print head can also be made shorter because the narrow actuators can be placed in side-by-side manner closer to the record media for a given amount of wire curvature.

In the wire matrix printer which is utilized for receipt and journal printing operation, the print head structure may be a multiple element type and horizontally disposed with the wire elements aligned in a vertical line and supported on a print head carriage which is caused to be moved or driven in a horizontal direction for printing in line manner across the receipt or journal paper and wherein the drive elements or transducers may be positioned in a circular configuration with the respective wires leading to the front tip of the print head. In the wire matrix printer which is utilized for business forms or like record media printing operation, the print head may be oriented in a manner wherein the nose is pointed downward for printing on the form, slip or like media while the carriage and print head are moved above and across the form or media in the horizontal direction.

In the dot matrix printer, there is a requirement for one or more small electric motors to drive certain parts of the printer. A small motor is used to drive the print head carriage in reciprocating manner in the printer that includes a stationary platen and a movable print head. A second motor is used to drive the paper such as a receipt, a slip or a journal at the end of the printing operation and which paper drive is usually performed at the ends of the lines of printing.

The demands of certain printing operations place a high duty cycle on the drive motor and associated drive mechanisms and it is essential that the motor and mechanisms be secured and contained in an appropriate manner because the motor and mechanisms are relied upon for long lasting operation which may involve either continuous or intermittent duty.

The use of screws, bolts, nuts and the like is well-known for securing the motor mounting flange to a side frame of the printer. Other fastening members have included self-tapping screws, for example, in plastic frames or serrated washers engaging the surface of metal frames. It is, of course, realized that the use of a smaller number of parts enables simpler and less costly products while maintaining quality of such products.

Representative documentation in the field of motor mountings and drive arrangements includes U.S. Pat. No. 3,941,339, issued to W. J. McCarty on Mar. 2, 1976, which discloses a motor mounting arrangement wherein a wall member has a passageway for the motor shaft and has aligned openings for motor support elements. A mounting member has a body portion with a collar projecting in the passageway along with sleeves in the openings. Retaining means are provided to prevent axial movement of the motor and mounting member relative to the wall member.

U.S. Pat. No. 4,034,620, issued to T. V. McNamara et al. on July 12, 1977, discloses a gear retainer having thrust means fixed to a main shaft and thrust surfaces defined by main shaft gears.

U.S. Pat. No. 4,111,290, issued to R. A. Carlstedt on Sept. 5, 1978, discloses a thrust bearing with a spring clip comprising a connector portion, a transverse portion and a tensioning portion formed intermediate the connector and transverse portions.

U.S. Pat. No. 4,155,020, issued to T. C. Skare on May 15, 1979, discloses a snap-fit fastening system for attaching a member to an electric motor wherein the stator through-bolts each include an extension with a lip thereon spaced from the head of the bolt. A shoulder orients the bolts in one pattern and the member has a plurality of slots to receive the extensions with the slots being arranged in another pattern offset from the first pattern to provide a snap-fit to lock the member.

U.S. Pat. No. 4,155,528, issued to D. C. Dawson on May 22, 1979, discloses an electric motor mounting device that includes an adjustable band clamp and a plurality of mounting legs with an end area of each leg closely captured between the clamp and the motor. The other end area of each leg has means for fixedly mounting the leg to associated structure.

U.S. Pat. No. 4,293,151, issued to E. V. Manzel on Oct. 6, 1981, discloses a connector for an electrical cable including a plurality of latching arms that are resiliently yieldable to pass through an opening in a conductive mounting wall and to snap outwardly behind such wall.

U.S. Pat. No. 4,410,160, issued to M. Alperin et al. on Oct. 18, 1983, discloses an arrangement for attaching a fan unit flush with a ceiling and which includes first and second bowl shaped circular members wherein one member is attached to a ceiling box and the other member has a plurality of slots to receive support rods of the one bowl member.

U.S. Pat. No. 4,420,136, issued to D. W. Lau on Dec. 13, 1983, discloses a mounting assembly for a fan motor which includes a clip or brace secured to the motor. The motor has mounting arms with a first section of a looped base portion fixed to the clip and a second section fixed to an adjacent mounting arm.

U.S. Pat. No. 4,502,583, issued to B. Limbacher on Mar. 5, 1985, discloses a drive unit comprising a motor, a clutch, and a gear box with a snap connection in the clutch release system.

U.S. Pat. No. 4,531,700, issued to C. W. Robinson on July 30, 1985, discloses an electric motor mounting arrangement wherein the motor has a mounting flange with a pair of diametrically opposed mounting ears with openings therein. A pair of motor support members is provided on a frame and includes cam projections aligned with the openings. The mounting flange is rotated until the projections snap into the openings.

U.S. Pat. No. 4,544,168, issued to R. Hans et al. on Oct. 1, 1985, discloses a seal between rotating concentric elements that has a holding ring with spring fingers.

U.S. Pat. No. 4,657,478, issued to R. H. LaZebnik et al. on Apr. 14, 1987, discloses a shroud for a belt driven fan that includes a planar apron and a tubular throat. Linear support members that are attached to the apron support an electric motor and the motor is mounted on a bracket attached to the support members for selective assembly thereon between operating and shipping positions.

U.S. Pat. No. 4,676,473, issued to W. E. Giles on June 30, 1987, discloses a compressor mounting system that includes a bracket, a plurality of legs secured to the compressor and to the housing, and a pin extending from the compressor and which passes through a hole in a mounting plate secured to the housing. The bracket is formed from two arcuate segments that form a ring surrounding the compressor.

U.S. Pat. No. 4,708,228, issued to K. V. L. Monstevens on Nov. 24, 1987, discloses a bearing support for motor vehicle clutch apparatus.

SUMMARY OF THE INVENTION

The present invention is directed to motor mounting means and gear mounting means and more particularly to a mounting bracket for supporting the motor and associated drive gears. The mounting bracket is of unitary construction and provides an enclosure that is formed to receive the mounting flange of the motor and to substantially enclose the motor.

The mounting bracket is generally square in shape and includes four sides of a depth to substantially cover the motor and to protect same in the printer. The mounting bracket has integral or built-in means for positioning and securing the motor. While such positioning and securing means is preferably made of plastic in a molding operation, it is, of course, optional to make the part or parts of sheet metal by means of a stamping operation.

The plastic mounting bracket includes at least two spring members or snap fingers at opposite corners of the bracket which is formed to have openings therein adjacent each of the fingers. The motor is inserted into the mounting bracket in an axial direction so that the motor mounting flange engages and deflects the snap fingers outwardly until the flange passes and is received by the tips of the fingers. The fingers snap back into normal position and the flange is secured by the two spring members that apply a force in a direction opposite the direction of insertion of the motor The spring members keep the mounting flange seated against the mounting bracket which eliminates any axial movement between the motor and the bracket. A pair of locating studs are provided to serve as installation guides and to prevent the motor mounting flange from moving in a rotational direction relative to the mounting bracket.

The mounting bracket also includes a plurality of integral hubs or journals molded on one side of the bracket for receiving drive gears associated with the drive shaft of the motor. Each of the gears is retained on the respective hub or journal by means of a snap member in the form of a ring that includes integral fingers for engaging with the hub or journal.

In view of the above discussion, a principal object of the present invention is to provide positioning and securing means for an electrical motor or other electromechanical or mechanical component.

Another object of the present invention is to provide a mounting bracket for a small motor having a mounting flange secured to the motor.

An additional object of the present invention is to provide a mounting bracket for an electric motor wherein the bracket includes two fingers as an integral part of the bracket for clamping a mounting flange of the motor.

A further object of the present invention is to provide a frame portion of a printer that forms a mounting bracket for a small electric motor wherein the bracket has spring members which clamp the motor mounting flange and has locating studs for positioning the flange.

Still another object of the present invention is to provide a mounting bracket for an electric motor wherein the bracket has integral hubs thereon for drive gears and snap elements engage with the hubs to retain the gears on the hubs.

Still a further object of the present invention is to provide a drive arrangement for record media that includes a mounting bracket for an electric motor, the mounting bracket having spring fingers for retaining the motor, having integral hubs thereon for journaling drive gears associated with the motor, and having snap elements for engaging with the hubs to retain the drive gears on the hubs.

Additional advantages and features of the present invention will become apparent and fully understood from a reading of the following description taken together with the annexed drawing.

BRIEF DESCRIPTION OF THE DRAWING

FIG. 2 is a left side elevational view of a printer frame member incorporating the structure of the present invention;

FIG. 3 is a top view taken on the line 3—3 of FIG. 2;

FIG. 4 is a front view taken on the line 4—4 of FIG. 2;

FIG. 5 is a right side elevational view of the printer frame member taken in the direction opposite from FIG. 2;

DESCRIPTION OF THE PREFERRED EMBODIMENT

Figure 1:
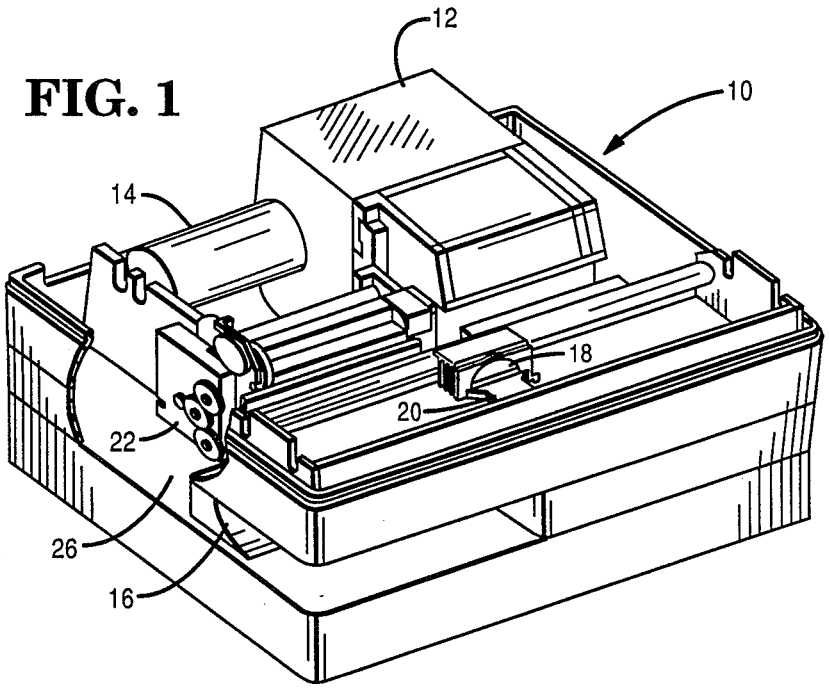
FIG. 1 is a perspective view of a printer showing the motor mounting arrangement.

FIG. 1 is a perspective view of a printer 10 incorporating the structure of the present invention. The printer 10 includes a journal station 12, a receipt station 14, and a slip station 16. The journal station 12 is positioned on the right hand side of the printer 10 and the receipt station 14 and the slip station 16 occupy the left side of the printer. A more detailed description of the arrangement of the receipt station 14 and the slip station 16 is found in U.S. Pat. No. 4,780,007, issued Oct. 25, 1988 and assigned to the assignee of the present invention. A print head 18 of the dot matrix type is mounted on a carriage 20 that is moved in well-known manner back and forth across the printer 10 in printing operations.

FIG. 2 is a side elevational view of a frame member 22 which provides the means for mounting a circular-shaped electric motor 24 in the printer 10, as best illustrated in FIG. 5. The frame member 22 is of unitary construction and preferably is made of plastic in a molding operation. A preferred material for the member 22 is polycarbonate with 15% PTFE (polytetrafluoroethylene) and 15% carbon fiber to provide for electrostatic discharge grounding. Another material that may be used is polycarbonate with 15% PTFE and 20% glass fiber. The frame member 22 is a portion of the printer 10 and is located in a left hand cavity 26 (FIG. 1) of the printer and provides support and bearing means for other parts or elements of the printer.

The frame member 22 (FIG. 2) includes a plate portion 28 having a bearing opening 30 for a shaft (not shown) that is used to support and drive a paper drive roller for receipt paper. A second bearing opening 32 is provided for a shaft (also not shown) that is used to support a camming roller operated for use with form or slip type media. A third bearing opening 34 is provided in the plate portion 28 to support a pivot shaft (not shown) also operated for use with form or slip type media. The orientation and mechanism of the structure associated with the bearing openings 30, 32 and 34 are fully described in the above-mentioned U.S. Pat. No. 4,780,007. The plate portion 28 provides supporting structure for record media (form or slip) thickness compensating mechanism which is described in the above-noted patent.

The frame member 22 (FIG. 2) is formed to provide an enclosure-type configuration, as 35, of generally square shape that includes walls 36, 38, 40 and 42 (FIG. 5). The walls 36, 38, 40 and 42 extend in an outward direction (toward the viewer in FIG. 2 and away from the viewer in FIG. 5) from the plate portion 28. The top wall 36 and the right hand wall 42 (FIG. 5) are essentially the same form, and the left hand wall 38 and the bottom wall 42 are similar in form except that the wall 38 is formed integral with the plate portion 28 of the frame member 22. A sidewall 44 connects and is integral with the four walls 36, 38, 40 and 42. The lower right hand corner of wall 42 and the upper left hand corner of the sidewall 44 (FIG. 5) are provided with cutout portions, as 46 in wall 42 and as 48 in sidewall 44 (FIG. 2). The wall 42 includes a finger 52 extending outwardly at an angle from a narrow portion 54 of the wall 42, and the sidewall 44 includes a finger 56 extending outwardly from the sidewall 44 (FIG. 3). The finger 56 is secured at its base end to the sidewall 44 and is secured to the wall 38 by means of a gusset 58 (FIG. 5) integral with the wall 38 and a portion 60 of the finger 56. The finger 56 is formed in turn-over manner and includes a first slanting portion 62 and a second slanting portion 64 (FIG. 3). The finger 52 has a tip 66 (FIG. 5) at the end thereof for engaging with a square mounting flange 68 of the motor and the finger 56 has a tip 70 at the end of the second slanting portion 64 for engaging with the mounting flange 68.

A plurality of spaced apertures 76, 78 and 80 (FIG. 2) are provided in the plate portion 28, the aperture 76 being placed in an upper portion 72 of the plate portion 28. The apertures 76 and 80 are provided to secure certain parts of the forms compensating mechanism and the aperture 78 is a clearance for a record media (form or slip) drive shaft (not shown). A circular recess 74 (FIG. 5) is provided in the upper portion 72 of the plate portion 28 to accommodate one end of the record media thickness compensating mechanism, mentioned above.

An opening 82 (FIG. 2) is provided in the sidewall 44 of the enclosure 35 to allow insertion of a motor shaft 84 having a splined member in the form of a drive gear 86 thereon. The sidewall 44 also includes a pair of pilot studs 88 and 90 as an integral part thereof and projecting towards the viewer in FIG. 5. The mounting flange 68 (FIG. 5) of the motor 24 has apertures 92 (FIG. 2) at the corners thereof for receiving the pilot studs 88 and 90. While the mounting flange 68 has four apertures 92 (FIG. 5), only two pilot studs 88 and 90 are deemed necessary in a preferred arrangement.

The motor 24 is inserted in an axial direction from the right in FIG. 4 and the motor mounting flange 68 bears against the fingers 52 and 56 (FIGS. 3 and 5) and deflects the fingers outwardly from the center of the enclosure 35. The pilot studs 88 and 90 guide the mounting flange 68 by means of the apertures 92 receiving the studs. The tips 66 and 70 (FIG. 5) of the respective fingers 52 and 56 capture the edges of the motor mounting flange 68 and secure the motor 24 in place against the sidewall 44 by snap action of the fingers in a direction back to their normal unrestrained position. This structure and positioning of the parts eliminates any axial play between the motor 24 and the frame member 22 which may be caused by any clearance between the motor flange 68 and the snap fingers 52 and 56.

The drive gear 86 (FIG. 2) is secured to the motor shaft 84 and engages with a first gear 94 positioned adjacent and upwardly from the drive gear 86. Gear 94 engages with a second gear 96 and with a third gear 98 which are positioned adjacent and relative to the first gear 94 to be simultaneously driven thereby. When the motor 24 is rotating in the clockwise direction (FIG. 2) the drive gear 86 is driven in the clockwise direction and the first gear 94 is driven in the counterclockwise direction. Both the second gear 96 and the third gear 98 are driven in the clockwise direction in an arrangement for driving receipt paper from the receipt station 14 and past the line of printing by driving the receipt paper shaft (not shown but journaled in bearing 30) in a counterclockwise direction.

Figure 6:
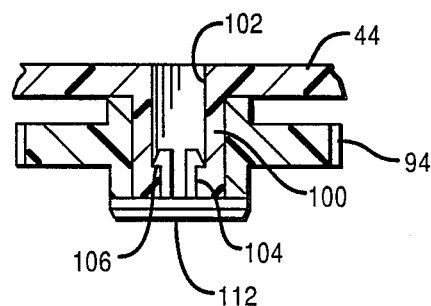
FIG. 6 is an enlarged view, partly in section, of the gear mounting arrangement.

FIG. 6 is a sectional view of a portion of the sidewall 44 against which the mounting plate 68 of the motor 24 is secured by the snap fingers 52 and 56 (FIG. 3). The sidewall 44 includes a plurality of hubs or journals, as 100, integral with the sidewall and extending outwardly in spaced, parallel arrangement. The hubs or journals 100 provide bearing surfaces for the first gear 94, the second gear 96 and the third gear 98 (FIG. 2), such first gear 94 being illustrated in FIG. 6. The sidewall 44 includes a plurality of apertures, as 102 (FIGS. 5 and 6), at precise positions in the sidewall and extending through each of the hubs or journals 100. The aperture 102 has a reduced diameter portion 104 near the outer end of the hub or journal 100 to provide a circular ledge 106 for receiving fingers 108 and 110 of a fastening element 112 (FIG. 8) for securing the gear 94 (FIG. 6).

Figure 7:
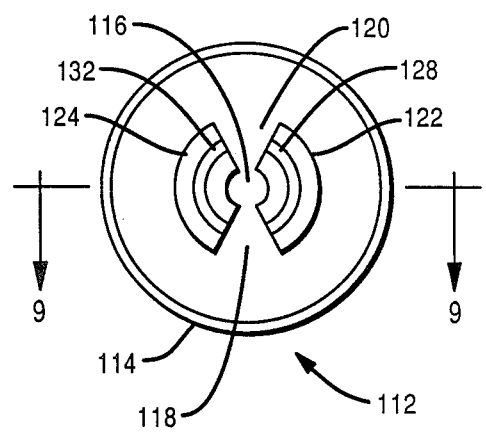
FIG. 7 is an enlarged view, taken from the side of FIG. 2, of the snap element for retaining the gear.
Figure 8:
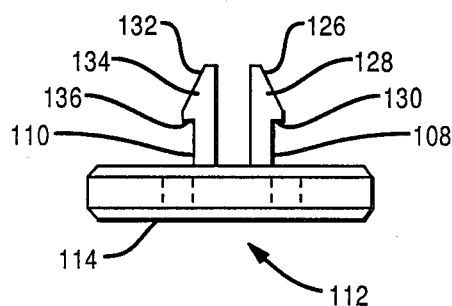
FIG. 8 is a top view of the snap element of FIG. 7.
Figure 9:
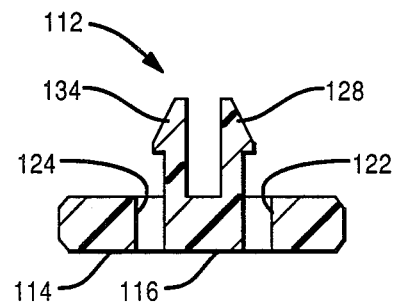
FIG. 9 is a sectional view of the snap element, taken on the line 9—9 of FIG. 7.

The fastening element 112, illustrated in an enlarged face view in FIG. 7, a top view in FIG. 8, and a sectional view in FIG. 9, is made of polycarbonate material by a molding process. The fastening element 112 has a circular face portion 114 of washer-like form which is connected to a central portion 116 by web portions 118 and 120 (FIG. 7). Openings 122 and 124 are provided in the face portion 114 of the element 112. The fingers 108 and 110 are an extension of the central portion 116 and are circular shaped except for the bifurcated structure. The finger 108 has a slanted surface 126 on a tip portion 128 and a lip 130, and the finger 110 has a like slanted surface 132 on a tip portion 134 and a like lip 136. The lips 130 and 136 fit over the circular ledge 106 of the hub 100 (FIG. 6) when the fastening element 112 is pressed into the reduced diameter portion 104 of the aperture 102 in the hub or journal 100.

It is thus seen that herein shown and described is a motor and gear mounting bracket for use in a printer. The bracket has a plurality of snap fingers that are engageable by the motor mounting flange and are biased upon insertion of the motor to spring outwardly and then to spring inwardly to capture the mounting flange. The drive gears are retained on journals or hubs by means of spring fingers which are sprung inwardly and then sprung outwardly to capture the drive gears. The mechanism and arrangement of the present invention enable the accomplishment of the objects and advantages mentioned above, and while a preferred embodiment has been disclosed herein, variations thereof may occur to those skilled in the art. It is contemplated that all such variations and modifications not departing from the spirit and scope of the invention hereof are to be construed in accordance with the following claims.

What is claimed is:

1. Apparatus for securing an electric motor and associated drive gears to the frame of a printer, the motor including a drive shaft and a mounting flange fixed to the motor, said apparatus comprising a
    frame member of unitary construction including a plate portion having bearing means for supporting the frame member on the printer, a
    housing portion integrally formed with the plate portion and of a shape to receive the mounting flange and to provide a surface therefor, said housing portion having walls for substantially enclosing the motor, a
    plurality of oppositely positioned fingers integrally formed with the walls of the housing portion, said fingers being sprung outwardly during insertion of the motor into the housing portion by engagement with said flange, said fingers returning to original position after passage of said flange and engaging a surface of the flange to retain the motor in the housing portion, a
    plurality of drive gears coupled with said drive shaft, said housing portion having a plurality of hubs integral with a wall thereof, each of said hubs having an aperture therethrough and said hubs extending outwardly from said wall in spaced, parallel arrangement with said motor drive shaft for journaling the respective drive gears, and
    means separate from said drive gears and engageable with said hubs for retaining the drive gears on the hubs and including spring portions inserted into said aperture and engaging with the hubs in snap-fit manner.

2. The apparatus of claim 1 wherein said housing portion includes a pair of pilot members and the mounting flange includes a pair of apertures therein for receiving the pilot members.

3. The apparatus of claim 1 wherein each of said apertures includes a reduced diameter portion defining a ledge engageable by said retaining means.

4. The apparatus of claim 1 wherein said retaining means includes a pair of finger elements sprung inwardly during insertion thereof into said aperture and returning to original position after engaging with said engageable means.

5. In a drive arrangement for an electric motor secured to the frame of a printer, the motor including a drive shaft extending from one end of the motor and a mounting flange surrounding the drive shaft and fixed to the motor, the improvement comprising a
    frame member of unitary construction and including a plate portion, a
    housing portion integrally formed with the plate portion and of a shape to receive the mounting flange and to provide a sidewall having a surface against which the flange is secured, said housing portion having walls formed together with said sidewall for substantially enclosing the motor, a
    plurality of oppositely positioned fingers integrally formed with the walls of the housing portion and inclined inwardly from said walls, said fingers being sprung outwardly during insertion of the motor into the housing portion by engagement with said flange, said fingers returning to original position after passage of said flange and engaging a surface of the flange to retain the motor in the housing portion, a
    plurality of drive gears coupled with the drive shaft, said housing portion having a plurality of hubs integral with the sidewall thereof, each of said hubs having an aperture therethrough and said hubs extending outwardly from said sidewall in spaced, parallel arrangement with the motor drive shaft for journaling the respective drive gears, and
    means separate from said drive gears and engageable with the hubs for retaining the drive gears on the hubs, said retaining means including spring portions inserted into the aperture and engaging with the hubs in snap-fit manner.

6. In the drive arrangement of claim 5 wherein the housing portion includes a pair of pilot members and the mounting flange includes a pair of apertures therein for receiving the pilot members.

7. In the drive arrangement of claim 5 wherein each of the plurality of hubs includes ledge means engageable by said spring portions of said retaining means for retaining said drive gears on respective hubs.

8. In the drive arrangement of claim 7 wherein said spring portions comprise a pair of finger elements sprung inwardly during insertion thereof into said aperture, engaging with said ledge means and returning to original position after engaging with said ledge means.

9. In the arrangement of claim 5 wherein the frame member is molded of polycarbonate material with polytetrafluoroethylene and carbon fiber material.

10. A mounting assembly for securing an electric motor and associated drive means to the frame of a printer, the motor having a mounting flange fixed thereto and a drive shaft extending from one end of the motor and through the mounting flange, said mounting assembly comprising a frame member of unitary construction and including a plate portion having spaced bearing means for supporting the frame member from the printer, a housing portion integrally formed with the plate portion and extending in one direction outwardly therefrom, said housing portion being of a shape defining a sidewall to receive the mounting flange of the motor and said sidewall having an inside surface against which the flange is seated, said housing portion having walls formed with said sidewall for substantially enclosing the motor, a plurality of oppositely positioned fingers integrally formed with the walls of the housing portion and inclined inwardly therefrom, said fingers being sprung outwardly during insertion of the motor into the housing portion by engagement with said flange, said fingers returning to original position after passage of said flange and engaging a surface of the flange to retain the motor in the housing portion, said associated drive means comprising a plurality of drive gears and said housing portion having a plurality of hubs integral with the sidewall thereof, each of the hubs defining an aperture therethrough with a reduced diameter portion and said hubs extending outwardly from said sidewall for journaling the respective drive gears, and snap means separate from said drive gears and engageable with the hubs for retaining the drive gears on the hubs, said snap means including spring elements having ends inserted into the aperture past the reduced diameter portion for engaging with the hubs in snap-fit manner.

11. The mounting assembly of claim 10 wherein the frame member is molded of polycarbonate resin with polytetrafluoroethylene and carbon fiber material.

12. The mounting assembly of claim 10 wherein the ends of said spring elements include slanted tip portions sprung inwardly during insertion past said reduced diameter portion of said hubs and having lip portions engageable with the reduced diameter portion of said hubs for retaining the drive gears on the hubs.

13. The mounting assembly of claim 10 wherein said snap means comprises a fastening element having a circular face portion and said spring elements are formed integral therewith.

14. The mounting assembly of claim 10 wherein said spring elements include circular shaped portions for insertion into the aperture of each of said hubs.

* * * * *